(12) United States Patent
Feng et al.

(10) Patent No.: US 11,581,002 B2
(45) Date of Patent: Feb. 14, 2023

(54) COMMUNICATION METHOD, APPARATUS, AND SYSTEM FOR DIGITAL ENHANCED CORDLESS TELECOMMUNICATIONS (DECT) BASE STATION

(71) Applicant: YEALINK (XIAMEN) NETWORK TECHNOLOGY CO., LTD., Fujian (CN)

(72) Inventors: Wanjian Feng, Fujian (CN); Bingyang Zeng, Fujian (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 95 days.

(21) Appl. No.: 17/218,155

(22) Filed: Mar. 30, 2021

(65) Prior Publication Data

US 2021/0312934 A1 Oct. 7, 2021

(30) Foreign Application Priority Data

Apr. 3, 2020 (CN) .......................... 202010262716.4

(51) Int. Cl.
*G10L 19/24* (2013.01)
*H04W 88/08* (2009.01)

(52) U.S. Cl.
CPC ............. *G10L 19/24* (2013.01); *H04W 88/08* (2013.01)

(58) Field of Classification Search
CPC ....... G10L 19/24; G10L 19/00; G10L 19/173; G10L 19/18; G10L 19/22
USPC .................. 704/200, 206, 221, 205, 211, 222
See application file for complete search history.

(56) References Cited

U.S. PATENT DOCUMENTS

| 2008/0027711 A1* | 1/2008 | Rajendran | ............. G10L 19/167 704/201 |
| 2010/0138724 A1* | 6/2010 | Fogel | .................... H04L 1/0084 714/776 |

\* cited by examiner

*Primary Examiner* — Qi Han (57) ABSTRACT

The present disclosure provides a communication method, apparatus, and system for a digital enhanced cordless telecommunications (DECT) base station. The method includes: determining, based on a communication connection request sent by a handset, whether a base station satisfies a wideband (WB) voice communication requirement of the handset, and returning communication acknowledgment information; and enabling the base station to perform WB voice communication with the handset if the communication acknowledgment information is a positive acknowledgment, or enabling the base station to perform narrowband (NB) voice communication with the handset if the communication acknowledgment information is a negative acknowledgment. The present disclosure can implement WB voice communication between a DECT base station and more than six handsets.

18 Claims, 2 Drawing Sheets

---

S11 — Determine, based on a communication connection request, whether a voice codec in a base station matches a first voice codec, and whether an operation capability of a current CPU of the base station supports WB voice communication with a handset S12 — If the voice codec in the base station matches the first voice codec, and the operation capability of the current CPU of the base station supports WB voice communication with the handset, return a positive acknowledgment S13 — If the voice codec in the base station does not match the first voice codec, or the operation capability of the current CPU of the base station does not support WB voice communication with the handset, return a negative acknowledgment

ABSTRACT# COMMUNICATION METHOD, APPARATUS, AND SYSTEM FOR DIGITAL ENHANCED CORDLESS TELECOMMUNICATIONS (DECT) BASE STATION

CROSS-REFERENCE TO RELATED APPLICATIONS

The present application claims the benefit of Chinese Patent Application No. 202010262716.4 filed on Apr. 3, 2020, the contents of which are hereby incorporated by reference.

TECHNICAL FIELD

The present disclosure relates to the field of wireless communications technologies, and in particular, to a communication method, apparatus, and system for a digital enhanced cordless telecommunications (DECT) base station.

BACKGROUND

Currently, a bandwidth of 12*32 kbps or 6*64 kbps is usually used for DECT communication. A DECT wireless communication channel can be divided into 12 transmitting channels and 12 receiving channels based on a full-slot channel. The DECT wireless communication channel can be divided into six transmitting channels and six receiving channels based on a long-slot channel. In the prior art, when the long-slot channel is used for communication, limited by an operation capability of a central processing unit (CPU), an audio codec with a bit rate of 64 kbps, for example, G722, is usually selected to transmit a wideband (WB) voice with a voice sampling rate of 16 KHz if required. In this case, one base station can perform WB voice communication with at most six terminals at the same time. In other words, at most six channels of WB voice transmission are supported. To implement more than six channels of voice communication, when the full-slot channel is used for communication, only a narrowband (NB) voice with a sampling rate of 8 KHz can be transmitted. In this case, an audio codec with a bit rate of 32 kbps, for example, G726, is usually selected. Therefore, a single DECT base station can perform WB voice communication with at most six handsets only. It can be learned that the DECT base station cannot perform WB voice communication with more than six handsets in the prior art.

SUMMARY

The present disclosure provides a communication method, apparatus, and system for a DECT base station, to overcome disadvantages in the prior art. The present disclosure can implement WB voice communication between a DECT base station and more than six handsets.

To resolve the foregoing technical problems, according to a first aspect, an embodiment of the present disclosure provides a communication method for a DECT base station. The method includes:

determining, based on a communication connection request sent by a handset, whether a base station satisfies a WB voice communication requirement of the handset, and returning communication acknowledgment information; and enabling the base station to perform WB voice communication with the handset if the communication acknowledgment information is a positive acknowledgment, or enabling the base station to perform NB voice communication with the handset if the communication acknowledgment information is a negative acknowledgment.

Further, the base station is provided with a first voice codec, wherein the first voice codec supports WB voice communication that uses a bit rate less than or equal to a preset bit rate, and the preset bit rate includes 32 kbps.

Further, the base station is provided with a first voice codec and a second voice codec, wherein the first voice codec supports WB voice communication that uses a bit rate less than or equal to a preset bit rate, the second voice codec supports NB voice communication that uses a bit rate less than or equal to the preset bit rate, and the preset bit rate includes 32 kbps.

Further, the handset is provided with a first codec and a second codec, wherein the first voice codec supports WB voice communication that uses a bit rate less than or equal to a preset bit rate, the second voice codec supports NB voice communication that uses a bit rate less than or equal to the preset bit rate, and the preset bit rate includes 32 kbps.

Further, the determining, based on a communication connection request sent by a handset, whether a base station satisfies a WB voice communication requirement of the handset, and returning communication acknowledgment information is specifically:

determining, based on the communication connection request, whether a voice codec in the base station matches the first voice codec, and whether an operation capability of a current CPU of the base station supports WB voice communication with the handset; and if the voice codec in the base station matches the first voice codec, and the operation capability of the current CPU of the base station supports WB voice communication with the handset, returning the positive acknowledgment; or if the voice codec in the base station does not match the first voice codec, or the operation capability of the current CPU of the base station does not support WB voice communication with the handset, returning the negative acknowledgment.

Further, the enabling the base station to perform WB voice communication with the handset if the communication acknowledgment information is a positive acknowledgment, or enabling the base station to perform NB voice communication with the handset if the communication acknowledgment information is a negative acknowledgment is specifically:

enabling the base station to perform WB voice communication with the handset by the first voice codec if the communication acknowledgment information is the positive acknowledgment, or enabling the base station to perform NB voice communication with the handset by the second voice codec if the communication acknowledgment information is the negative acknowledgment.

Further, the enabling the base station to perform WB voice communication with the handset includes:

compressing a bit rate of a WB voice signal to the preset bit rate.

According to a second aspect, an embodiment of the present disclosure provides a communications apparatus for a DECT base station, including:

a wireless transceiver module, configured to determine, based on a communication connection request sent by a handset, whether a base station satisfies a WB voice communication requirement of the handset, and return communication acknowledgment information; and an encoding/decoding module, configured to enable the base station to perform WB voice communication with the handset if the communication acknowledgment information is a positive acknowledgment, or enable the base station to perform NB voice communication with the handset if the communication acknowledgment information is a negative acknowledgment.

Further, the wireless transceiver module includes a DECT radio frequency transceiver and a processor.

Further, the encoding/decoding module includes a first voice codec, wherein the first voice codec supports WB voice communication that uses a bit rate less than or equal to a preset bit rate, and the preset bit rate includes 32 kbps.

Further, the encoding/decoding module includes a first codec and a second codec, wherein the first voice codec supports WB voice communication that uses a bit rate less than or equal to a preset bit rate, the second voice codec supports NB voice communication that uses a bit rate less than or equal to the preset bit rate, and the preset bit rate includes 32 kbps.

Further, the handset is provided with a first voice codec and a second voice codec, wherein the first voice codec supports WB voice communication that uses a bit rate less than or equal to a preset bit rate, the second voice codec supports NB voice communication that uses a bit rate less than or equal to the preset bit rate, and the preset bit rate includes 32 kbps.

Further, the wireless transceiver module is configured to determine, based on a communication connection request sent by a handset, whether a base station satisfies a WB voice communication requirement of the handset, and return communication acknowledgment information, and is specifically configured to:

determine, based on the communication connection request, whether a voice codec in the base station matches the first voice codec, and whether an operation capability of a current CPU of the base station supports WB voice communication with the handset; and if the voice codec in the base station matches the first voice codec, and the operation capability of the current CPU of the base station supports WB voice communication with the handset, return the positive acknowledgment; or if the voice codec in the base station does not match the first voice codec, or the operation capability of the current CPU of the base station does not support WB voice communication with the handset, return the negative acknowledgment.

Further, the encoding/decoding module is configured to enable the base station to perform WB voice communication with the handset if the communication acknowledgment information is a positive acknowledgment, or enable the base station to perform NB voice communication with the handset if the communication acknowledgment information is a negative acknowledgment, and is specifically configured to:

enable the base station to perform WB voice communication with the handset by the first voice codec if the communication acknowledgment information is the positive acknowledgment, or enable the base station to perform NB voice communication with the handset by the second voice codec if the communication acknowledgment information is the negative acknowledgment.

Further, the communication apparatus for a DECT base station includes:

a computing power module, configured to compress a bit rate of a WB voice signal to the preset bit rate, wherein the computing power module includes a processor.

According to a third aspect, an embodiment of the present disclosure provides a communications system for a DECT base station, including at least one base station and a plurality of handsets, wherein the base station includes a first transceiver module and a first encoding/decoding module, and the handset includes a second transceiver module and a second encoding/decoding module.

The first transceiver module is configured to determine, based on a communication connection request sent by the handset, whether the base station satisfies a WB voice communication requirement of the handset, and return communication acknowledgment information.

The first encoding/decoding module is configured to enable the base station to perform WB voice communication with the handset if the communication acknowledgment information is a positive acknowledgment, or enable the base station to perform NB voice communication with the handset if the communication acknowledgment information is a negative acknowledgment.

The second transceiver module is configured to send the communication connection request to the base station and receive the communication acknowledgment information.

The second encoding/decoding module is configured to enable the handset to perform WB voice communication with the base station if the communication acknowledgment information is the positive acknowledgment, or enable the handset to perform NB voice communication with the base station if the communication acknowledgment information is the negative acknowledgment.

The embodiments of the present disclosure have the following beneficial effects:

Communication acknowledgment information obtained by determining whether a base station satisfies a WB voice communication requirement of a handset is returned based on a communication connection request sent by the handset. When the communication acknowledgment information is a positive acknowledgment, in other words, when the base station satisfies the WB voice communication requirement of the handset, the base station is enabled to perform WB voice communication with the handset. When the communication acknowledgment information is a negative acknowledgment, in other words, when the base station does not satisfy the WB voice communication requirement of the handset, the base station is enabled to perform NB voice communication with the handset. In this way, WB voice transmission or NB voice transmission is implemented. In the present disclosure, when a DECT base station needs to perform wireless communication with more than six handsets, before voice communication with each handset, whether the base station satisfies a WB voice communication requirement of the handset is determined, so that the base station can perform WB voice communication or NB voice communication with the handset based on an actual situation of the base station, thereby implementing WB voice communication between the DECT base station and the more than six handsets. This is different from the prior art.

DETAILED DESCRIPTION

The technical solutions in the present disclosure are clearly and completely described below with reference to the accompanying drawings in the present disclosure. Apparently, the described embodiments are only a part rather than all of the embodiments of the present disclosure. All other embodiments obtained by a person of ordinary skill in the art based on the embodiments of the present disclosure without creative efforts shall fall within the protection scope of the present disclosure.

It should be noted that step numbers in this specification are only intended to facilitate explanation of specific embodiments, and are not used to limit a sequence of steps.

Figure 1:
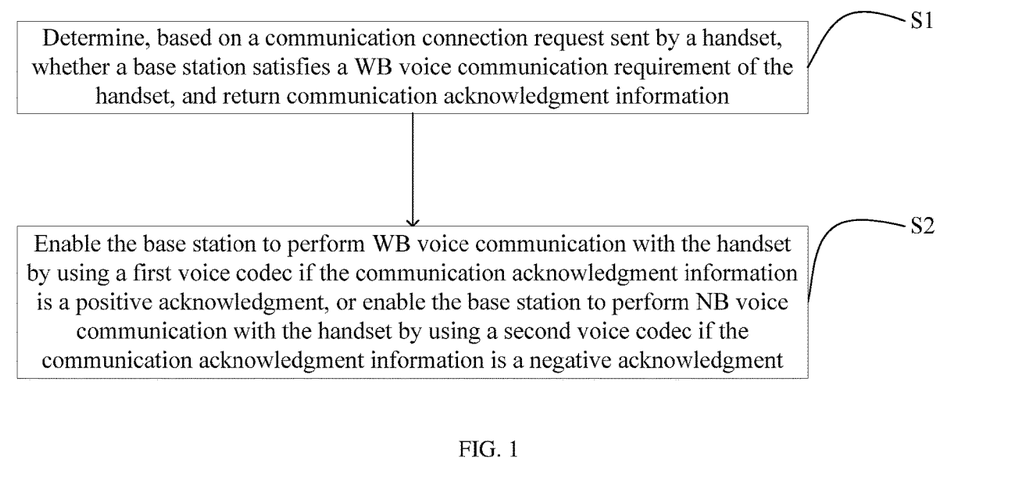
FIG. 1 is a schematic flowchart of a communication method for a DECT base station according to Embodiment 1 of the present disclosure.
Figure 2:
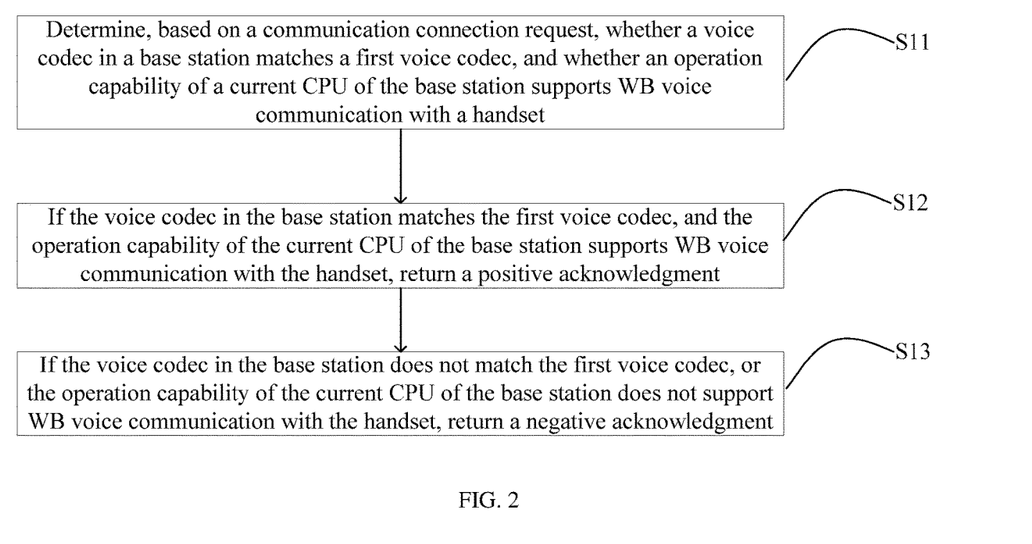
FIG. 2 is a schematic flowchart of a preferred embodiment according to Embodiment 1 of the present disclosure.

For Embodiment 1, refer to FIG. 1 and FIG. 2.

As shown in FIG. 1, Embodiment 1 provides a communication method for a DECT base station. The method includes steps S1 and S2.

S1: Determine, based on a communication connection request sent by a handset, whether a base station satisfies a WB voice communication requirement of the handset, and return communication acknowledgment information.

S2: Enable the base station to perform WB voice communication with the handset if the communication acknowledgment information is a positive acknowledgment, or enable the base station to perform NB voice communication with the handset if the communication acknowledgment information is a negative acknowledgment.

In this embodiment, the base station is provided with a first voice codec and a second voice codec, and the handset is also provided with a first voice codec and a second voice codec that match the base station. The first voice codec supports WB voice communication that uses a bit rate less than or equal to a preset bit rate. The second voice codec supports NB voice communication that uses a bit rate less than or equal to the preset bit rate. The preset bit rate includes 32 kbps.

It should be noted that the first voice codec can run at half a bit rate to support WB voice communication that uses the bit rate less than or equal to the preset bit rate.

A bandwidth of 12*32 kbps or 6*64 kbps is usually used for DECT communication. Therefore, when the DECT base station needs to perform wireless communication with more than six handsets, the first voice codec with a bit rate less than or equal to 32 kbps is used to perform WB voice communication with the handset. This can reduce communication bandwidth, increase WB voice transmission channels, and implement at most 12 channels of WB voice transmission. Limited by an operation capability of a CPU, it is recommended to implement eight to ten channels of WB voice communication, and at most 12 channels of WB voice communication can be implemented.

In an example, the base station uses a DCX81 system on a chip (SoC) chip as its DECT SoC chip. The DCX81 SoC chip is a communications chip including a DECT radio frequency transceiver and a processor, and is configured to send and receive voice data between the base station and the handset, receive the communication connection request sent by the handset, and return the communication acknowledgment information. The base station uses a YL2018 chip as its APP SoC chip. The YL2018 chip is a computing power chip including an Opus voice codec capable of implementing voice communication that uses a plurality of bit rates (namely, the first voice codec), a voice codec with a bit rate of 32 kbps (namely, the second voice codec), for example, G726 or G723, and a digital signal processor (DSP), and is configured to determine whether the base station satisfies the WB voice communication requirement of the handset, and enable the base station to perform WB voice communication or NB voice communication with the handset. The handset uses a DCX81 SoC chip as its DECT SoC chip. The DCX81 SoC chip is a communications chip including a DECT radio frequency transceiver and a processor, and is configured to send and receive the voice data between the base station and the handset, send the communication connection request to the base station, and receive the communication acknowledgment information. The handset has an external DBMD8 DSP TL3 chip and a voice codec matching the base station. The DBMD8 DSP TL3 chip is a computing power chip including a DSP. The voice codec matching the base station is an Opus voice codec capable of implementing voice communication that uses a plurality of bit rates (namely, the first voice codec), and a voice codec with the bit rate of 32 kbps (namely, the second voice codec), for example, G726 or G723, and is configured to perform WB voice communication and NB voice communication with the base station.

In another example, the base station uses a DCX81 SoC chip as its DECT SoC chip. The DCX81 SoC chip is a communications chip including a DECT radio frequency transceiver and a processor, and is configured to send and receive voice data between the base station and the handset, receive the communication connection request sent by the handset, and return the communication acknowledgment information. The base station uses a YL2018 chip as its APP SoC chip. The YL2018 chip is a computing power chip including an Opus voice codec capable of implementing voice communication that uses a plurality of bit rates (namely, the first and second voice codecs), and a DSP, and is configured to determine whether the base station satisfies the WB voice communication requirement of the handset, and enable the base station to perform WB voice communication or NB voice communication with the handset. The handset uses a DCX81 SoC chip as its DECT SoC chip. The DCX81 SoC chip is a communications chip including a DECT radio frequency transceiver and a processor, and is configured to send and receive the voice data between the base station and the handset, send the communication connection request to the base station, and receive the communication acknowledgment information. The handset has an external DBMD8 DSP TL3 chip and a voice codec matching the base station. The DBMD8 DSP TL3 chip is a computing power chip including a DSP. The voice codec matching the base station is an Opus voice codec capable of implementing voice communication that uses a plurality of bit rates (namely, the first and second voice codecs), and is configured to perform WB voice communication and NB voice communication with the base station.

A voice transmission and encoding/decoding process performed among the base station, the handset, and a Voice over Internet Protocol (VoIP) telephone in a network is as follows: After receiving encoded voice data from the Opus voice codec of the handset, the DCX81 SoC chip of the base station transmits the encoded Opus voice data to the YL2018 chip through time division multiplexing (TDM). The YL2018 chip decodes the received encoded Opus voice data to obtain pulse code modulation (PCM) data, encodes the PCM data into encoded network voice data, and sends the encoded network voice data to the remote VoIP telephone by the network. The YL2018 chip of the base station receives, by the network, encoded network voice data from the remote VoIP telephone, for example, voice data encoded by G722, decodes the encoded network voice data to obtain PCM data, and encodes the PCM data into encoded Opus voice data. The YL2018 chip of the base station sends the encoded Opus voice data to the DCX81 SoC chip of the base station through TDM. The DCX81 SoC chip of the base station sends the encoded Opus voice data to the handset through air wireless communication.

A voice transmission and encoding/decoding process performed between the handset and the base station is as follows: The DCX81 SoC chip of the handset transmits PCM voice data picked up by a microphone on the handset to the DBMD8 DSP TL3 chip of the handset by an external interface. The DBMD8 DSP TL3 chip encodes the PCM voice data into encoded Opus voice data, and transmits the encoded Opus voice data back to the DCX81 SoC chip of the handset by the external interface. The DCX81 SoC chip of the handset sends the encoded Opus voice data to the base station by a wireless transceiver. The DCX81 SoC chip of the handset receives remote encoded Opus voice data from the base station, and sends the received encoded Opus voice data to the DBMD8 DSP TL3 chip by the external interface. The DBMD8 DSP TL3 chip decodes the encoded Opus voice data to obtain PCM voice data, and transmits the PCM voice data back to the DCX81 SoC chip of the handset by the external interface. The DCX81 SoC chip plays the received PCM voice data by a local loudspeaker.

The Opus voice codec is a low-complexity communications codec. Compared with a traditional DECT WB codec, the Opus voice codec can run at half a bit rate, support NB, WB, and half/ultra WB modes, and implement WB voice communication that uses the bit rate of 32 kbps. When the base station only performs WB voice communication with the handset, the Opus voice codec can be used to implement more than six channels of WB voice communication.

The base station and the handset each are provided with the chip including the DSP. This can enhance the operation capability of the CPU, and support compression of a WB voice to the bit rate of 32 kbps. In this way, a single DECT base station can cooperate with at most 12 handsets to implement at most 12 channels of WB voice transmission at the same time.

This embodiment improves performance of the processors of the base station and the handset, and an encoding/decoding compression rate under same transmission bandwidth, so that the DECT base station can transmit more original voice data. This greatly optimizes tone quality of voice communication in a DECT base station of a same scale and improves user experience.

Based on the foregoing examples, in the step S1, the base station receives, by the DCX81 SoC chip, the communication connection request sent by the handset, determines, by the YL2018 chip, whether the base station satisfies the WB voice communication requirement of the handset, and returns the communication acknowledgment information to the handset by the DCX81 SoC chip.

In the step S2, when the communication acknowledgment information is the positive acknowledgment, in other words, when the base station satisfies the WB voice communication requirement of the handset, the YL2018 chip is used to enable the base station to perform WB voice communication with the handset by the Opus voice codec with the bit rate of 32 kbps (namely, the first voice codec) on the YL2018 chip. When the communication acknowledgment information is the negative acknowledgment, in other words, when the base station does not satisfy the WB voice communication requirement of the handset, the YL2018 chip is used to enable the base station to perform NB voice communication with the handset by the voice codec with the bit rate of 32 kbps (namely, the second voice codec) on the YL2018 chip, for example, G726 or G723. In this way, WB voice transmission or NB voice transmission is implemented.

When the DECT base station needs to perform wireless communication with more than six handsets, after receiving a communication connection request sent by a handset, the base station immediately determines, based on the communication connection request sent by the handset, whether the base station satisfies a WB voice communication requirement of the handset, for example, whether the base station has the first voice codec matching the handset, and whether the operation capability of the current CPU of the base station supports WB voice communication with the handset, obtains communication acknowledgment information, and determines, based on the communication acknowledgment information, whether to perform WB voice communication or NB voice communication with the handset.

In this embodiment, the communication acknowledgment information obtained by determining whether the base station satisfies the WB voice communication requirement of the handset is returned based on the communication connection request sent by the handset. When the communication acknowledgment information is the positive acknowledgment, in other words, when the base station satisfies the WB voice communication requirement of the handset, the base station is enabled to perform WB voice communication with the handset by the first voice codec. When the communication acknowledgment information is the negative acknowledgment, in other words, when the base station does not satisfy the WB voice communication requirement of the handset, the base station is enabled to perform NB voice communication with the handset by the second voice codec. In this way, WB voice transmission or NB voice transmission is implemented. In this embodiment, the first voice codec and the second voice codec that run at half a bit rate are disposed in the base station. When the DECT base station needs to perform wireless communication with more than six handsets, before voice communication with each handset, whether the base station satisfies a WB voice communication requirement of the handset is determined, so that based on an actual situation of the base station, the base station can perform WB voice communication with the handset by the first voice codec or perform NB voice communication with the handset by the second voice codec, thereby implementing WB voice communication between the DECT base station and the more than six handsets.

As shown in FIG. 2, in a preferred embodiment, the step S1 specifically includes steps S11 to S13.

S11: Determine, based on the communication connection request, whether a voice codec in the base station matches the first voice codec, and whether the operation capability of the current CPU of the base station supports WB voice communication with the handset.

S12: If the voice codec in the base station matches the first voice codec, and the operation capability of the current CPU of the base station supports WB voice communication with the handset, return the positive acknowledgment.

S13: If the voice codec in the base station does not match the first voice codec, or the operation capability of the current CPU of the base station does not support WB voice communication with the handset, return the negative acknowledgment.

In the preferred embodiment, the enabling the base station to perform WB voice communication with the handset if the communication acknowledgment information is a positive acknowledgment, or enabling the base station to perform NB voice communication with the handset if the communication acknowledgment information is a negative acknowledgment is specifically: enabling the base station to perform WB voice communication with the handset by the first voice codec if the communication acknowledgment information is the positive acknowledgment, or enabling the base station to perform NB voice communication with the handset by the second voice codec if the communication acknowledgment information is the negative acknowledgment.

Specifically, before voice communication, the base station and the handset will pre-negotiate a voice codec to be used. The handset sends the communication connection request to the base station. The base station needs to determine whether its voice codec matches the first voice codec, in other words, whether the base station has the first voice codec matching the handset, for example, the Opus voice codec. If the base station has the first voice codec such as the Opus voice codec, and the operation capability of the current CPU of the base station supports WB voice communication with the handset, the base station returns the positive acknowledgment, so that the base station performs WB voice communication with the handset by the first voice codec. The first voice codec can run at half a bit rate to implement WB voice communication that uses the bit rate of 32 kbps. Therefore, more than six channels of WB voice communication can be implemented. If the base station does not have the first voice codec such as the Opus voice codec, or the operation capability of the current CPU of the base station cannot support WB voice communication with the handset, the base station returns the negative acknowledgment, so that the base station performs NB voice communication with the handset by the second voice codec. In this case, hybrid WB and NB communication can be implemented for different handsets, and more than six channels of voice communication can be implemented when WB voice communication is available.

In this embodiment, before performing voice communication with the handset, the base station determines whether its voice codec matches the first voice codec of the handset, and whether the operation capability of the current CPU of the base station supports WB voice communication with the handset, so that based on an actual situation of the base station, the base station can perform WB voice communication with the handset by the first voice codec or perform NB voice communication with the handset by the second voice codec.

In the preferred embodiment, the enabling the base station to perform WB voice communication with the handset includes: compressing a bit rate of a WB voice signal to the preset bit rate.

In this embodiment, the bit rate of the WB voice signal is compressed to the preset bit rate, to effectively improve the operation capability of the CPU of the DECT base station. In this way, not limited by the operation capability of the CPU, a single DECT base station can cooperate with at most 12 handsets to implement at most 12 channels of WB voice transmission at the same time.

Figure 3:
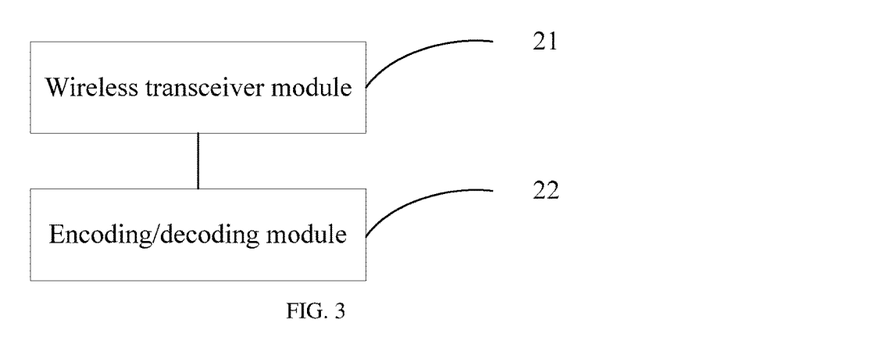
FIG. 3 is a schematic structural diagram of a communications apparatus for a DECT base station according to Embodiment 2 of the present disclosure.

For Embodiment 2, refer to FIG. 3.

As shown in FIG. 3, Embodiment 2 provides a communications apparatus for a DECT base station. The communications apparatus includes: a wireless transceiver module 21, configured to determine, based on a communication connection request sent by a handset, whether a base station satisfies a WB voice communication requirement of the handset, and return communication acknowledgment information; and an encoding/decoding module 22, configured to enable the base station to perform WB voice communication with the handset if the communication acknowledgment information is a positive acknowledgment, or enable the base station to perform NB voice communication with the handset if the communication acknowledgment information is a negative acknowledgment.

In this embodiment, the wireless transceiver module 21 includes a DECT radio frequency transceiver and a processor. The encoding/decoding module 22 includes a first voice codec and a second voice codec. The handset is also provided with a first voice codec and a second voice codec that match the encoding/decoding module 22. The first voice codec supports WB voice communication that uses a bit rate less than or equal to a preset bit rate, the second voice codec supports NB voice communication that uses a bit rate less than or equal to the preset bit rate, and the preset bit rate includes 32 kbps.

It should be noted that the first voice codec can run at half a bit rate to support WB voice communication that uses the bit rate less than or equal to the preset bit rate.

A bandwidth of 12*32 kbps or 6*64 kbps is usually used for DECT communication. Therefore, when the DECT base station needs to perform wireless communication with more than six handsets, the first voice codec with a bit rate less than or equal to 32 kbps is used to perform WB voice communication with the handset. This can reduce communication bandwidth, increase WB voice transmission channels, and implement at most 12 channels of WB voice transmission. Limited by an operation capability of a CPU, it is recommended to implement eight to ten channels of WB voice communication, and at most 12 channels of WB voice communication can be implemented.

In an example, a DECT SoC chip of the base station uses a DCX81 SoC chip as the wireless transceiver module 21. The DCX81 SoC chip is a communications chip including a DECT radio frequency transceiver and a processor, and is configured to send and receive voice data between the base station and the handset, receive the communication connection request sent by the handset, and return the communication acknowledgment information. An APP SoC chip of the base station uses a YL2018 chip as the encoding/decoding module 22. The YL2018 chip is a computing power chip including an Opus voice codec capable of implementing voice communication that uses a plurality of bit rates (namely, the first voice codec), a voice codec with a bit rate of 32 kbps (namely, the second voice codec), for example, G726 or G723, and a DSP, and is configured to determine whether the base station satisfies the WB voice communication requirement of the handset, and enable the base station to perform WB voice communication or NB voice communication with the handset. The handset uses a DCX81 SoC chip as its DECT SoC chip. The DCX81 SoC chip is a communications chip including a DECT radio frequency transceiver and a processor, and is configured to send and receive the voice data between the base station and the handset, send the communication connection request to the base station, and receive the communication acknowledgment information. The handset has an external DBMD8 DSP TL3 chip and a voice codec matching the base station. The DBMD8 DSP TL3 chip is a computing power chip including a DSP. The voice codec matching the base station is an Opus voice codec capable of implementing voice communication that uses a plurality of bit rates (namely, the first voice codec), and a voice codec with the bit rate of 32 kbps (namely, the second voice codec), for example, G726 or G723, and is configured to perform WB voice communication and NB voice communication with the base station.

In another example, a DECT SoC chip of the base station uses a DCX81 SoC chip as the wireless transceiver module 21. The DCX81 SoC chip is a communications chip including a DECT radio frequency transceiver and a processor, and is configured to send and receive voice data between the base station and the handset, receive the communication connection request sent by the handset, and return the communication acknowledgment information. An APP SoC chip of the base station uses a YL2018 chip as the encoding/decoding module 22. The YL2018 chip is a computing power chip including an Opus voice codec capable of implementing voice communication that uses a plurality of bit rates (namely, the first and second voice codecs), and a DSP, and is configured to determine whether the base station satisfies the WB voice communication requirement of the handset, and enable the base station to perform WB voice communication or NB voice communication with the handset. The handset uses a DCX81 SoC chip as its DECT SoC chip. The DCX81 SoC chip is a communications chip including a DECT radio frequency transceiver and a processor, and is configured to send and receive the voice data between the base station and the handset, send the communication connection request to the base station, and receive the communication acknowledgment information. The handset has an external DBMD8 DSP TL3 chip and a voice codec matching the base station. The DBMD8 DSP TL3 chip is a computing power chip including a DSP. The voice codec matching the base station is an Opus voice codec capable of implementing voice communication that uses a plurality of bit rates (namely, the first and second voice codecs), and is configured to perform WB voice communication and NB voice communication with the base station.

The Opus voice codec is a low-complexity communications codec. Compared with a traditional DECT WB codec, the Opus voice codec can run at half a bit rate, support NB, WB, and half/ultra WB modes, and implement WB voice communication that uses the bit rate of 32 kbps. When the base station only performs WB voice communication with the handset, the Opus voice codec can be used to implement more than six channels of WB voice communication.

The base station and the handset each are provided with the chip including the DSP. This can enhance the operation capability of the CPU, and support compression of a WB voice to the bit rate of 32 kbps. In this way, a single DECT base station can cooperate with at most 12 handsets to implement at most 12 channels of WB voice transmission at the same time.

This embodiment improves performance of the processors of the base station and the handset, and an encoding/decoding compression rate under same transmission bandwidth, so that the DECT base station can transmit more original voice data. This greatly optimizes tone quality of voice communication in a DECT base station of a same scale and improves user experience.

The base station receives, by the wireless transceiver module 21, the communication connection request sent by the handset, determines, by the encoding/decoding module 22, whether the base station satisfies the WB voice communication requirement of the handset, and returns, by the wireless transceiver module 21, the communication acknowledgment information to the handset.

When the communication acknowledgment information is the positive acknowledgment, in other words, when the base station satisfies the WB voice communication requirement of the handset, the encoding/decoding module 22 is used to enable the base station to perform WB voice communication with the handset by the Opus voice codec with the bit rate of 32 kbps (namely, the first voice codec) in the encoding/decoding module 22. When the communication acknowledgment information is the negative acknowledgment, in other words, when the base station does not satisfy the WB voice communication requirement of the handset, the encoding/decoding module 22 is used to enable the base station to perform NB voice communication with the handset by the voice codec with the bit rate of 32 kbps (namely, the second voice codec) in the encoding/decoding module 22, for example, G726 or G723. In this way, WB voice transmission or NB voice transmission is implemented.

When the DECT base station needs to perform wireless communication with more than six handsets, after receiving a communication connection request sent by a handset, the base station immediately determines, based on the communication connection request sent by the handset, whether the base station satisfies a WB voice communication requirement of the handset, for example, whether the base station has the first voice codec matching the handset, and whether an operation capability of a current CPU of the base station supports WB voice communication with the handset, obtains communication acknowledgment information, and determines, based on the communication acknowledgment information, whether to perform WB voice communication or NB voice communication with the handset.

In this embodiment, the wireless transceiver module 21 is used to return, based on the communication connection request sent by the handset, the communication acknowledgment information obtained by determining whether the base station satisfies the WB voice communication requirement of the handset. When the communication acknowledgment information is the positive acknowledgment, in other words, when the base station satisfies the WB voice communication requirement of the handset, the encoding/decoding module 22 is used to enable the base station to perform WB voice communication with the handset by the first voice codec. When the communication acknowledgment information is the negative acknowledgment, in other words, when the base station does not satisfy the WB voice communication requirement of the handset, the encoding/decoding module 22 is used to enable the base station to perform NB voice communication with the handset by the second voice codec. In this way, WB voice transmission or NB voice transmission is implemented. In this embodiment, the first voice codec and the second voice codec that run at half a bit rate are disposed in the base station. When the DECT base station needs to perform wireless communication with more than six handsets, before voice communication with each handset, whether the base station satisfies a WB voice communication requirement of the handset is determined, so that based on an actual situation of the base station, the base station can perform WB voice communication with the handset by the first voice codec or perform NB voice communication with the handset by the second voice codec, thereby implementing WB voice communication between the DECT base station and the more than six handsets.

In a preferred embodiment, the wireless transceiver module is configured to determine, based on a communication connection request sent by a handset, whether a base station satisfies a WB voice communication requirement of the handset, and return communication acknowledgment information, and is specifically configured to: determine, based on the communication connection request, whether a voice codec in the base station matches the first voice codec, and whether the operation capability of the current CPU of the base station supports WB voice communication with the handset; and if the voice codec in the base station matches the first voice codec, and the operation capability of the current CPU of the base station supports WB voice communication with the handset, return the positive acknowledgment; or if the voice codec in the base station does not match the first voice codec, or the operation capability of the current CPU of the base station does not support WB voice communication with the handset, return the negative acknowledgment.

In the preferred embodiment, the encoding/decoding module is configured to: enable the base station to perform WB voice communication with the handset if the communication acknowledgment information is a positive acknowledgment, or enable the base station to perform NB voice communication with the handset if the communication acknowledgment information is a negative acknowledgment, and is specifically configured to: enable the base station to perform WB voice communication with the handset by the first voice codec if the communication acknowledgment information is the positive acknowledgment, or enable the base station to perform NB voice communication with the handset by the second voice codec if the communication acknowledgment information is the negative acknowledgment.

Specifically, before voice communication, the base station and the handset will pre-negotiate a voice codec to be used. The handset sends the communication connection request to the base station. The base station needs to determine whether its voice codec matches the first voice codec, in other words, whether the base station has the first voice codec matching the handset, for example, the Opus voice codec. If the base station has the first voice codec such as the Opus voice codec, and the operation capability of the current CPU of the base station supports WB voice communication with the handset, the base station returns the positive acknowledgment, so that the base station performs WB voice communication with the handset by the first voice codec. The first voice codec can run at half a bit rate to implement WB voice communication that uses the bit rate of 32 kbps. Therefore, more than six channels of WB voice communication can be implemented. If the base station does not have the first voice codec such as the Opus voice codec, or the operation capability of the current CPU of the base station cannot support WB voice communication with the handset, the base station returns the negative acknowledgment, so that the base station performs NB voice communication with the handset by the second voice codec. In this case, hybrid WB and NB communication can be implemented for different handsets, and more than six channels of voice communication can be implemented when WB voice communication is available.

In this embodiment, before performing voice communication with the handset by the wireless transceiver module 21, the base station determines whether its voice codec matches the first voice codec of the handset, and whether the operation capability of the current CPU of the base station supports WB voice communication with the handset, so that based on an actual situation of the base station, the base station can perform WB voice communication with the handset by the first voice codec or perform NB voice communication with the handset by the second voice codec.

In the preferred embodiment, the communications apparatus for a DECT base station further includes: a computing power module, configured to compress a bit rate of a WB voice signal to the preset bit rate, wherein the computing power module includes a processor.

In this embodiment, the bit rate of the WB voice signal is compressed to the preset bit rate by the computing power module, to effectively improve the operation capability of the CPU of the DECT base station. In this way, not limited by the operation capability of the CPU, a single DECT base station can cooperate with at most 12 handsets to implement at most 12 channels of WB voice transmission at the same time.

Figure 4:
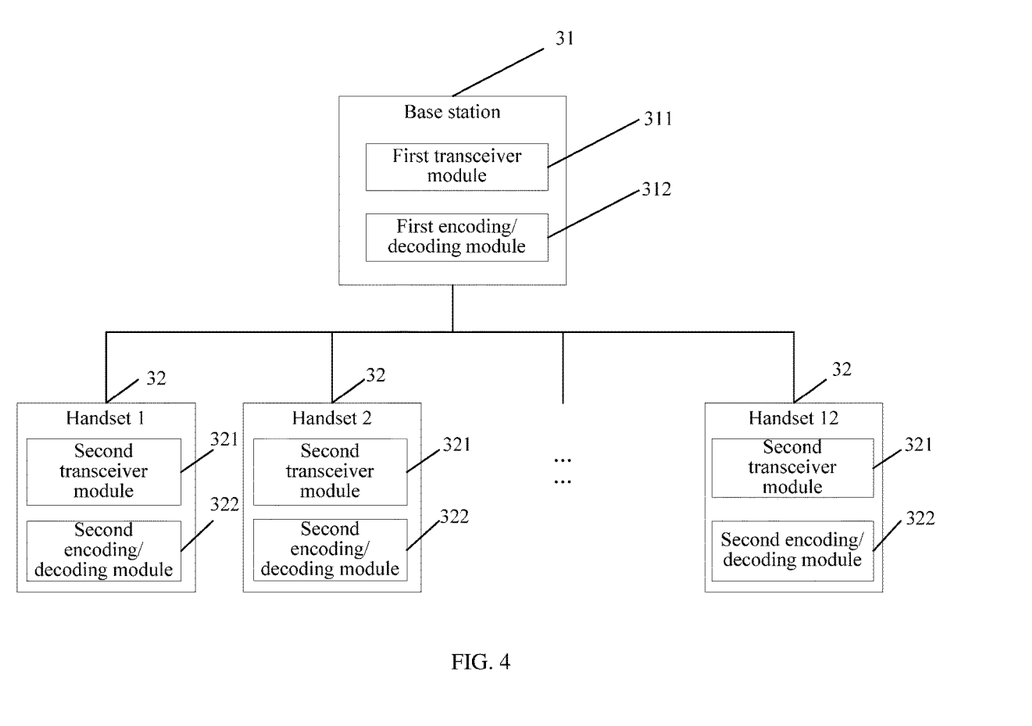
FIG. 4 is a schematic structural diagram of a communications system for a DECT base station according to Embodiment 3 of the present disclosure.

For Embodiment 3, refer to FIG. 4.

As shown in FIG. 4, Embodiment 3 provides a communications system for a DECT base station. The communications system includes at least one base station 31 and a plurality of handsets 32. The base station 31 includes a first transceiver module 311 and a first encoding/decoding module 312. The handset 32 includes a second transceiver module 321 and a second encoding/decoding module 322. The first transceiver module 311 is configured to determine, based on a communication connection request sent by the handset 32, whether the base station 31 satisfies a WB voice communication requirement of the handset 32, and return communication acknowledgment information. The first encoding/decoding module 312 is configured to enable the base station 31 to perform WB voice communication with the handset 32 if the communication acknowledgment information is a positive acknowledgment, or enable the base station 31 to perform NB voice communication with the handset 32 if the communication acknowledgment information is a negative acknowledgment. The second transceiver module 321 is configured to send the communication connection request to the base station 31, and receive the communication acknowledgment information. The second encoding/decoding module 322 is configured to enable the handset 32 to perform WB voice communication with the base station 31 if the communication acknowledgment information is the positive acknowledgment, or enable the handset 32 to perform NB voice communication with the base station 31 if the communication acknowledgment information is the negative acknowledgment.

In this embodiment, the base station 31 is provided with a first voice codec and a second voice codec, and the handset 32 is also provided with a first voice codec and a second voice codec that match the base station 31. The first voice codec supports WB voice communication that uses a bit rate less than or equal to a preset bit rate. The second voice codec supports NB voice communication that uses a bit rate less than or equal to the preset bit rate. The preset bit rate includes 32 kbps.

It should be noted that the first voice codec can run at half a bit rate to support WB voice communication that uses the bit rate less than or equal to the preset bit rate.

A bandwidth of 12*32 kbps or 6*64 kbps is usually used for DECT communication. Therefore, when the DECT base station 31 needs to perform wireless communication with more than six handsets 32, the first voice codec with a bit rate less than or equal to 32 kbps is used to perform WB voice communication with the handset 32. This can reduce communication bandwidth, increase WB voice transmission channels, and implement at most 12 channels of WB voice transmission. Limited by an operation capability of a CPU, it is recommended to implement eight to ten channels of WB voice communication, and at most 12 channels of WB voice communication can be implemented.

In an example, a DECT SoC chip of the base station 31 uses a DCX81 SoC chip as the first transceiver module 311. The DCX81 SoC chip is a communications chip including a DECT radio frequency transceiver and a processor, and is configured to send and receive voice data between the base station 31 and the handset 32, receive the communication connection request sent by the handset 32, and return the communication acknowledgment information. An APP SoC of the base station 31 uses a YL2018 chip as the first encoding/decoding module 312. The YL2018 chip is a computing power chip including an Opus voice codec capable of implementing voice communication that uses a plurality of bit rates (namely, the first voice codec), a voice codec with a bit rate of 32 kbps (namely, the second voice codec), for example, G726 or G723, and a DSP, and is configured to determine whether the base station 31 satisfies the WB voice communication requirement of the handset 32, and enable the base station 31 to perform WB voice communication or NB voice communication with the handset 32. A DECT SoC chip of the handset 32 uses a DCX81 SoC chip as the second transceiver module 321. The DCX81 SoC chip is a communications chip including a DECT radio frequency transceiver and a processor, and is configured to send and receive the voice data between the base station 31 and the handset 32, send the communication connection request to the base station 31, and receive the communication acknowledgment information. The handset 32 has an external DBMD8 DSP TL3 chip and uses, as the second encoding/decoding module 322, a voice codec matching the base station 31. The DBMD8 DSP TL3 chip is a computing power chip including a DSP. The voice codec matching the base station 31 is an Opus voice codec capable of implementing voice communication that uses a plurality of bit rates (namely, the first voice codec), and a voice codec with the bit rate of 32 kbps (namely, the second voice codec), for example, G726 or G723, and is configured to perform WB voice communication and NB voice communication with the base station 31.

In another example, a DECT SoC chip of the base station 31 uses a DCX81 SoC chip as the first transceiver module 311. The DCX81 SoC chip is a communications chip including a DECT radio frequency transceiver and a processor, and is configured to send and receive voice data between the base station 31 and the handset 32, receive the communication connection request sent by the handset 32, and return the communication acknowledgment information. An APP SoC chip of the base station 31 uses a YL2018 chip as the first encoding/decoding module 312. The YL2018 chip is a computing power chip including an Opus voice codec capable of implementing voice communication that uses a plurality of bit rates (namely, the first and second voice codecs), and a DSP, and is configured to determine whether the base station 31 satisfies the WB voice communication requirement of the handset 32, and enable the base station 31 to perform WB voice communication or NB voice communication with the handset 32. A DECT SoC chip of the handset 32 uses a DCX81 SoC chip as the second transceiver module 321. The DCX81 SoC chip is a communications chip including a DECT radio frequency transceiver and a processor, and is configured to send and receive the voice data between the base station 31 and the handset 32, send the communication connection request to the base station 31, and receive the communication acknowledgment information. The handset 32 has an external DBMD8 DSP TL3 chip and uses, as the second encoding/decoding module 322, a voice codec matching the base station 31. The DBMD8 DSP TL3 chip is a computing power chip including a DSP. The voice codec matching the base station 31 is an Opus voice codec capable of implementing voice communication that uses a plurality of bit rates (namely, the first and second voice codecs), and is configured to perform WB voice communication and NB voice communication with the base station 31.

The Opus voice codec is a low-complexity communications codec. Compared with a traditional DECT WB codec, the Opus voice codec can run at half a bit rate, support NB, WB, and half/ultra WB modes, and implement WB voice communication that uses the bit rate of 32 kbps. When the base station 31 only performs WB voice communication with the handset 32, the Opus voice codec can be used to implement more than six channels of WB voice communication.

The base station 31 and the handset 32 each are provided with the chip including the DSP. This can enhance the operation capability of the CPU, and support compression of a WB voice to the bit rate of 32 kbps. In this way, a single DECT base station 31 can cooperate with at most 12 handsets 32 to implement at most 12 channels of WB voice transmission at the same time.

This embodiment improves performance of the processors of the base station 31 and the handset 32, and an encoding/decoding compression rate under same transmission bandwidth, so that the DECT base station 31 can transmit more original voice data. This greatly optimizes tone quality of voice communication in a DECT base station 31 of a same scale and improves user experience.

The base station 31 receives, by the first transceiver module 311, the communication connection request sent by the handset 32, determines, by the first encoding/decoding module 312, whether the base station 31 satisfies the WB voice communication requirement of the handset 32, and returns, by the first transceiver module 311, the communication acknowledgment information to the handset 32.

When the communication acknowledgment information is the positive acknowledgment, in other words, when the base station 31 satisfies the WB voice communication requirement of the handset 32, the first encoding/decoding module 312 is used to enable the base station 31 to perform WB voice communication with the handset 32 by the Opus voice codec with the bit rate of 32 kbps (namely, the first voice codec) in the first encoding/decoding module 312. When the communication acknowledgment information is the negative acknowledgment, in other words, when the base station 31 does not satisfy the WB voice communication requirement of the handset 32, the first encoding/decoding module 312 is used to enable the base station 31 to perform NB voice communication with the handset 32 by the voice codec with the bit rate of 32 kbps (namely, the second voice codec) in the first encoding/decoding module 312, for example, G726 or G723. In this way, WB voice transmission or NB voice transmission is implemented.

When the DECT base station 31 needs to perform wireless communication with more than six handsets 32, after receiving a communication connection request sent by a handset 32, the base station 31 immediately determines, based on the communication connection request sent by the handset 32, whether the base station 31 satisfies a WB voice communication requirement of the handset 32, for example, whether the base station 31 has the first voice codec matching the handset 32, and whether an operation capability of a current CPU of the base station 31 supports WB voice communication with the handset 32, obtains communication acknowledgment information, and determines, based on the communication acknowledgment information, whether to perform WB voice communication or NB voice communication with the handset 32.

In this embodiment, the first transceiver module 311 is used to return, based on the communication connection request sent by the handset 32, the communication acknowledgment information obtained by determining whether the base station 31 satisfies the WB voice communication requirement of the handset 32. When the communication acknowledgment information is the positive acknowledgment, in other words, when the base station 31 satisfies the WB voice communication requirement of the handset 32, the base station 31 is enabled to perform WB voice communication with the handset 32 by the first voice codec. When the communication acknowledgment information is the negative acknowledgment, in other words, when the base station 31 does not satisfy the WB voice communication requirement of the handset 32, the base station 31 is enabled to perform NB voice communication with the handset 32 by the second voice codec. In this way, WB voice transmission or NB voice transmission is implemented.

In this embodiment, the first voice codec and the second voice codec that run at half a bit rate are disposed in the base station 31. When the DECT base station 31 needs to perform wireless communication with more than six handsets 32, before voice communication with each handset 32, whether the base station 31 satisfies a WB voice communication requirement of the handset 32 is determined, so that based on an actual situation of the base station 31, the base station 31 can perform WB voice communication with the handset 32 by the first voice codec or perform NB voice communication with the handset 32 by the second voice codec, thereby implementing WB voice communication between the DECT base station 31 and the more than six handsets 32.

In a preferred embodiment, the first transceiver module 311 is configured to determine, based on a communication connection request sent by a handset 32, whether a base station 31 satisfies a WB voice communication requirement of the handset 32, and return communication acknowledgment information, and is specifically configured to: determine, based on the communication connection request, whether a voice codec in the base station 31 matches the first voice codec, and whether the operation capability of the current CPU of the base station 31 supports WB voice communication with the handset 32; and if the voice codec in the base station 31 matches the first voice codec, and the operation capability of the current CPU of the base station 31 supports WB voice communication with the handset 32, return the positive acknowledgment; or if the voice codec in the base station 31 does not match the first voice codec, or the operation capability of the current CPU of the base station 31 does not support WB voice communication with the handset 32, return the negative acknowledgment.

In the preferred embodiment, the first encoding/decoding module 312 is configured to enable the base station 31 to perform WB voice communication with the handset 32 if the communication acknowledgment information is a positive acknowledgment, or enable the base station 31 to perform NB voice communication with the handset 32 if the communication acknowledgment information is a negative acknowledgment, and is specifically configured to: enable the base station 31 to perform WB voice communication with the handset 32 by the first voice codec if the communication acknowledgment information is the positive acknowledgment, or enable the base station 31 to perform NB voice communication with the handset 32 by the second voice codec if the communication acknowledgment information is the negative acknowledgment.

Specifically, before voice communication, the base station 31 and the handset 32 will pre-negotiate a voice codec to be used. The handset 32 sends the communication connection request to the base station 31. The base station 31 needs to determine whether its voice codec matches the first voice codec, in other words, whether the base station 31 has the first voice codec matching the handset 32, for example, the Opus voice codec. If the base station 31 has the first voice codec such as the Opus voice codec, and the operation capability of the current CPU of the base station 31 supports WB voice communication with the handset 32, the base station 31 returns the positive acknowledgment, so that the base station 31 performs WB voice communication with the handset 32 by the first voice codec. The first voice codec can run at half a bit rate to implement WB voice communication that uses the bit rate of 32 kbps. Therefore, more than six channels of WB voice communication can be implemented. If the base station 31 does not have the first voice codec such as the Opus voice codec, or the operation capability of the current CPU of the base station 31 cannot support WB voice communication with the handset 32, the base station 31 returns the negative acknowledgment, so that the base station 31 performs NB voice communication with the handset 32 by the second voice codec. In this case, hybrid WB and NB communication can be implemented for different handsets 32, and more than six channels of voice communication can be implemented when WB voice communication is available.

In this embodiment, before performing voice communication with the handset 32, the base station 31 determines whether its voice codec matches the first voice codec of the handset 32, and whether the operation capability of the current CPU of the base station 31 supports WB voice communication with the handset 32, so that based on an actual situation of the base station 31, the base station 31 can perform WB voice communication with the handset 32 by the first voice codec or perform NB voice communication with the handset 32 by the second voice codec.

In the preferred embodiment, the enabling the base station 31 to perform WB voice communication with the handset 32 includes: compressing a bit rate of a WB voice signal to the preset bit rate.

In this embodiment, the bit rate of the WB voice signal is compressed to the preset bit rate, to effectively improve the operation capability of the CPU of the DECT base station 31. In this way, not limited by the operation capability of the CPU, a single DECT base station 31 can cooperate with at most 12 handsets 32 to implement at most 12 channels of WB voice transmission at the same time.

To sum up, the embodiments of the present disclosure have the following beneficial effects:

Communication acknowledgment information obtained by determining whether a base station satisfies a WB voice communication requirement of a handset is returned based on a communication connection request sent by the handset. When the communication acknowledgment information is a positive acknowledgment, in other words, when the base station satisfies the WB voice communication requirement of the handset, the base station is enabled to perform WB voice communication with the handset. When the communication acknowledgment information is a negative acknowledgment, in other words, when the base station does not satisfy the WB voice communication requirement of the handset, the base station is enabled to perform NB voice communication with the handset. In this way, WB voice transmission or NB voice transmission is implemented. In the present disclosure, when a DECT base station needs to perform wireless communication with more than six handsets, before voice communication with each handset, whether the base station satisfies a WB voice communication requirement of the handset is determined, so that the base station can perform WB voice communication or NB voice communication with the handset based on an actual situation of the base station, thereby implementing WB voice communication between the DECT base station and the more than six handsets. This is different from the prior art.

The descriptions above are preferred implementations of the present disclosure, and it should be noted that for a person of ordinary skill in the art, various improvements and modifications can be made without departing from the principles of the present disclosure. These improvements and modifications should also be regarded as falling into the protection scope of the present disclosure.

A person of ordinary skill in the art can understand that all or some of processes for implementing the foregoing embodiments can be completed by a computer program instructing relevant hardware. The program may be stored in a computer-readable storage medium. When the program is executed, the processes of the foregoing embodiments may be performed. The storage medium may be a magnetic disk, an optical disc, a read-only memory (ROM), a random access memory (RAM), or the like.

The invention claimed is:

1. A communication method for a digital enhanced cordless telecommunications (DECT) base station, comprising:
    determining, based on a communication connection request sent by a handset, whether a base station satisfies a wideband (WB) voice communication requirement of the handset, and returning communication acknowledgment information; and
    enabling the base station to perform WB voice communication with the handset if the communication acknowledgment information is a positive acknowledgment, or enabling the base station to perform narrowband (NB) voice communication with the handset if the communication acknowledgment information is a negative acknowledgment;
    wherein the base station is provided with a first voice codec, wherein the first voice codec supports WB voice communication that uses a bit rate less than or equal to a preset bit rate;
    wherein the determining, based on a communication connection request sent by a handset, whether a base station satisfies a WB voice communication requirement of the handset, and returning communication acknowledgment information is specifically:
    determining, based on the communication connection request, whether a voice codec in the base station matches the first voice codec, and whether an operation capability of a current central processing unit (CPU) of the base station supports WB voice communication with the handset; and
    if the voice codec in the base station matches the first voice codec, and the operation capability of the current CPU of the base station supports WB voice communication with the handset, returning the positive acknowledgment; or
    if the voice codec in the base station does not match the first voice codec, or the operation capability of the current CPU of the base station does not support WB voice communication with the handset, returning the negative acknowledgment.

2. The communication method for a DECT base station according to claim 1, wherein the preset bit rate comprises 32 kbps.

3. The communication method for a DECT base station according to claim 2, wherein the enabling the base station to perform WB voice communication with the handset comprises:
    compressing a bit rate of a WB voice signal to the preset bit rate.

4. The communication method for a DECT base station according to claim 1, wherein the base station is further provided with a second voice codec, wherein the first voice codec supports WB voice communication that uses a bit rate less than or equal to a preset bit rate, the second voice codec supports NB voice communication that uses a bit rate less than or equal to the preset bit rate, and the preset bit rate comprises 32 kbps.

5. The communication method for a DECT base station according to claim 4, wherein the enabling the base station to perform WB voice communication with the handset if the communication acknowledgment information is a positive acknowledgment, or enabling the base station to perform NB voice communication with the handset if the communication acknowledgment information is a negative acknowledgment is specifically:
    enabling the base station to perform WB voice communication with the handset by the first voice codec if the communication acknowledgment information is the positive acknowledgment, or enabling the base station to perform NB voice communication with the handset by the second voice codec if the communication acknowledgment information is the negative acknowledgment.

6. The communication method for a DECT base station according to claim 4, wherein the enabling the base station to perform WB voice communication with the handset comprises:
    compressing a bit rate of a WB voice signal to the preset bit rate.

7. The communication method for a DECT base station according to claim 1, wherein the handset is provided with a first voice codec and a second voice codec, wherein the first voice codec supports WB voice communication that uses a bit rate less than or equal to a preset bit rate, the second voice codec supports NB voice communication that uses a bit rate less than or equal to the preset bit rate, and the preset bit rate comprises 32 kbps.

8. The communication method for a DECT base station according to claim 7, wherein the enabling the base station to perform WB voice communication with the handset comprises:
    compressing a bit rate of a WB voice signal to the preset bit rate.

9. A communications apparatus for a DECT base station, wherein the communications apparatus for a DECT base station comprises:
    a wireless transceiver module, configured to determine, based on a communication connection request sent by a handset, whether a base station satisfies a WB voice communication requirement of the handset, and return communication acknowledgment information; and
    an encoding/decoding module, configured to enable the base station to perform WB voice communication with the handset if the communication acknowledgment information is a positive acknowledgment, or enable the base station to perform NB voice communication with the handset if the communication acknowledgment information is a negative acknowledgment;

wherein the encoding/decoding module comprises a first voice codec, wherein the first voice codec supports WB voice communication that uses a bit rate less than or equal to a preset bit rate;

wherein the wireless transceiver module is configured to determine, based on a communication connection request sent by a handset, whether a base station satisfies a WB voice communication requirement of the handset, and return communication acknowledgment information, and is specifically configured to:

determine, based on the communication connection request, whether a voice codec in the base station matches the first voice codec, and whether an operation capability of a current CPU of the base station supports WB voice communication with the handset; and if the voice codec in the base station matches the first voice codec, and the operation capability of the current CPU of the base station supports WB voice communication with the handset, return the positive acknowledgment; or if the voice codec in the base station does not match the first voice codec, or the operation capability of the current CPU of the base station does not support WB voice communication with the handset, return the negative acknowledgment.

10. The communications apparatus for a DECT base station according to claim 9, wherein the wireless transceiver module comprises a DECT radio frequency transceiver and a processor.

11. The communications apparatus for a DECT base station according to claim 9, wherein the preset bit rate comprises 32 kbps.

12. The communications apparatus for a DECT base station according to claim 11, wherein the communications apparatus for a DECT base station further comprises:

a computing power module, configured to compress a bit rate of a WB voice signal to the preset bit rate, wherein the computing power module comprises a processor.

13. The communications apparatus for a DECT base station according to claim 9, wherein the encoding/decoding module further comprises a second voice codec, wherein the first voice codec supports WB voice communication that uses a bit rate less than or equal to a preset bit rate, the second voice codec supports NB voice communication that uses a bit rate less than or equal to the preset bit rate, and the preset bit rate comprises 32 kbps.

14. The communications apparatus for a DECT base station according to claim 13, wherein the encoding/decoding module is configured to enable the base station to perform WB voice communication with the handset if the communication acknowledgment information is a positive acknowledgment, or enable the base station to perform NB voice communication with the handset if the communication acknowledgment information is a negative acknowledgment, and is specifically configured to:

enable the base station to perform WB voice communication with the handset by the first voice codec if the communication acknowledgment information is the positive acknowledgment, or enable the base station to perform NB voice communication with the handset by the second voice codec if the communication acknowledgment information is the negative acknowledgment.

15. The communications apparatus for a DECT base station according to claim 13, wherein the communications apparatus for a DECT base station further comprises:

a computing power module, configured to compress a bit rate of a WB voice signal to the preset bit rate, wherein the computing power module comprises a processor.

16. The communications apparatus for a DECT base station according to claim 9, wherein the handset is provided with a first voice codec and a second voice codec, wherein the first voice codec supports WB voice communication that uses a bit rate less than or equal to a preset bit rate, the second voice codec supports NB voice communication that uses a bit rate less than or equal to the preset bit rate, and the preset bit rate comprises 32 kbps.

17. The communications apparatus for a DECT base station according to claim 16, wherein the communications apparatus for a DECT base station further comprises:

a computing power module, configured to compress a bit rate of a WB voice signal to the preset bit rate, wherein the computing power module comprises a processor.

18. A communications system for a DECT base station, comprising at least one base station and a plurality of handsets, wherein the base station comprises a first transceiver module and a first encoding/decoding module, and the handset comprises a second transceiver module and a second encoding/decoding module;

the first transceiver module is configured to determine, based on a communication connection request sent by the handset, whether the base station satisfies a WB voice communication requirement of the handset, and return communication acknowledgment information;

the first encoding/decoding module is configured to enable the base station to perform WB voice communication with the handset if the communication acknowledgment information is a positive acknowledgment, or enable the base station to perform NB voice communication with the handset if the communication acknowledgment information is a negative acknowledgment;

wherein the base station is provided with a first voice codec, wherein the first voice codec supports WB voice communication that uses a bit rate less than or equal to a preset bit rate;

wherein the first transceiver module is specifically configured to:

determine, based on the communication connection request, whether a voice codec in the base station matches the first voice codec, and whether an operation capability of a current central processing unit (CPU) of the base station supports WB voice communication with the handset; and if the voice codec in the base station matches the first voice codec, and the operation capability of the current CPU of the base station supports WB voice communication with the handset, return the positive acknowledgment; or if the voice codec in the base station does not match the first voice codec, or the operation capability of the current CPU of the base station does not support WB voice communication with the handset, return the negative acknowledgment;

the second transceiver module is configured to send the communication connection request to the base station and receive the communication acknowledgment information; and the second encoding/decoding module is configured to enable the handset to perform WB voice communication with the base station if the communication acknowledgment information is the positive acknowledgment, or enable the handset to perform NB voice communication with the base station if the communication acknowledgment information is the negative acknowledgment.

* * * * *